Patented Oct. 21, 1941

UNITED STATES PATENT OFFICE 2,259,735

METALLIZED ACID POLYAZO DYES

Moses L. Crossley, Plainfield, and Lincoln M. Shafer, Upper Montclair, N. J., assignors to American Cyanamid Company, New York, N. Y., a corporation of Maine No Drawing. Application October 31, 1939, Serial No. 302,133

13 Claims. (Cl. 260—145)

This invention relates to metallized polyazo dyes which show excellent fastness to light and more particularly, polyazo dyes metallized with the metals of the fifth and sixth groups of the periodic table of elements especially vanadium, chromium, tungsten, molybdenum and tellurium.

This application is in part a continuation of our co-pending application, Serial No. 150,540, filed June 26, 1937, which matured into U. S. Patent No. 2,213,647 on September 3, 1940.

The metallized dyes of the present invention are obtained by metallizing a polyazo dye having a middle component which is a dihydroxy aryl compound capable of combining with two molecules of diazo compounds in positions ortho to the hydroxy groups, at least one of the diazo compounds having a metallizable group such as a hydroxyl or carboxyl group ortho to the azo group and at least one end component containing a solubilizing group. The dyes may be represented by the following general structural formula:

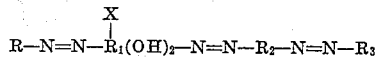

in which R, $R_1$, $R_2$ and $R_3$ are aryl radicals, the two hydroxyl groups on $R_1$ are ortho to the azo groups, X represents groups such as halogen, alkyl, alkoxy, nitro, carboxyl, sulfonic, hydroxyl and hydrogen. At least one of the radicals R and $R_2$ has a metallizable group ortho to the azo group connecting the radical to $R_1$ and at least one of the radicals R and $R_3$ has a solubilizing group.

In carrying out the present invention, the polyazo dyes are metallized with one or more metals of the fifth and sixth groups of the periodic table of elements such as vanadium, chromium, tungsten, molybdenum and tellurium or combinations with other metals such as chromium-copper, copper-vanadium, etc. These combinations of metals react with the dye to produce a product which is not identical with the mixture of the products obtained by treating portions of the dye with separate metals. The metallic combination or complex enters into the dye molecule in some manner which is different from the reaction of a single metal. The precise form of chemical combination has not yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases correspond to a species under the general formula in which both R and $R_2$ contain hydroxyl or carboxyl groups ortho to the azo groups.

The present invention is not limited to a particular process of producing the dyes. Normally they will be prepared by coupling the dihydroxy compound with a diazo compound and a diazoazo compound. Of course, the polyazo dyes may be produced by successive couplings of diazoamino compounds which are then rediazotized and further coupled. The end components may be the same or different.

Metallization is effected in the normal manner, for example, by refluxing an aqueous solution of the dye with salts or other suitable compounds of the metals or mixed metals.

In general, the new dyes are dark colored powders which are quite soluble in water and are capable of producing valuable colors of varied tones when dyed from an acid bath on wool, silk, leather and furs. The dyes show good to excellent fastness to light, washing, fulling, acid, alkalies and sea water. The degree of fastness will vary with the particular dyes and with the metals used.

When dyes of the class here described are metallized with chromium extraordinary fastness to light is obtained. Excellent fastness to light is obtained when metallization is accomplished with vanadium, tungsten, and tellurium. Combinations of two or more of these metals also give excellent results and combinations may be made of one or more metals belonging to other groups of the periodic system.

The invention will be described in detail in the following examples but it should be understood that the invention is not limited to the details therein set forth.

Example 1

11.05 parts of picramate of soda are suspended in 50 parts of water and diazotized with 6.4 parts hydrochloric acid (real) and 3.66 parts of sodium nitrite keeping the temperature between 25 and 30° C. The excess of acidity is neutralized with a saturated solution of bicarbonate of soda. This diazo solution is then added to a solution containing 5.88 parts of resorcinol in 200 parts of water and 8.5 parts bicarbonate of soda. The mixture is stirred until coupling is complete and 14.5 parts of soda ash added. Then a diazo solution obtained by treating 14.7 parts of amino azo benzene sulfonic acid in 170 parts of water with 3.66 parts of nitrite and 5.6 parts of acid at 60–63° C. is added and the mixture stirred until coupling is complete. The dye is salted out with sodium chloride after the solution is made slightly acid to Congo. The resulting dye paste is dissolved in 800 parts of hot water and 12 parts of sodium acetate added. The solution is heated to 60° C. and a solution containing 12 parts of vanadium sulfate added. The entire mixture is then boiled for two hours and salted out with sodium chloride, filtered and dried at 65–70° C. The product is a dark brown powder, soluble in water, producing a brownish red color. It dyes animal fibers reddish tones of brown of excellent fastness.

The formula for the dye prior to metallization, is as follows:

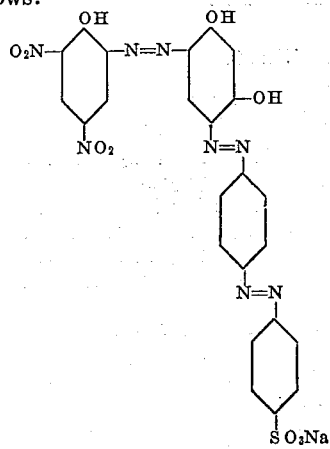

Example 2

160 parts of 1-5 dihydroxy naphthalene is suspended in 2500 parts of water and 400 parts of soda ash is added. The solution is cooled with ice to 5–10° C. and then mixed with the diazo product obtained from 189 parts of 2 amino phenol 4 sulfonic acid. The mixture is stirred until coupling is complete. Then the diazo compound obtained from 307 parts of the dye produced by coupling para amino salicylic acid with alpha naphthyl-amine in acid solution is added. Sufficient sodium carbonate to have the reaction alkaline throughout the coupling is added. Then the mixture is stirred until the second coupling is complete. The reaction must be alkaline throughout the coupling. The mixture is then made acid to Congo and the dye salted out with sodium chloride. The dye is filtered and the paste suspended in 6000 parts of water and treated with 300 parts of a soluble tungstate, then the mixture is boiled for several hours. The resulting dye is then salted out with sodium chloride. It is soluble in water and dyes animal fibers black. Other metals mentioned in the specification may be substituted for tungstate and similar metallized products obtained.

The formula for the dye prior to metallization is as follows:

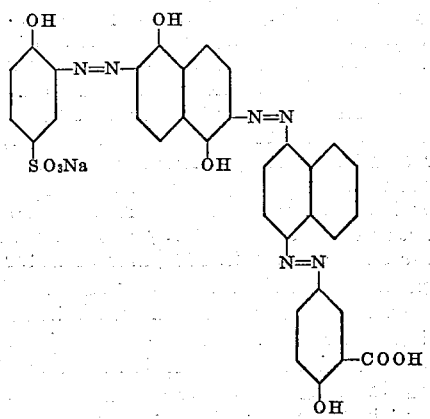

Example 3

160 parts of 1-5 dihydroxy naphthalene is suspended in 2500 parts of water and 400 parts of soda ash is added. The solution is cooled with ice to 5–10° C. and then mixed with the diazo solution from 154 parts of 4 nitro 2 amino 1 phenol. The mixture is stirred until coupling is complete. Then the diazo solution obtained by diazotizing the 473 parts of the dye obtained by coupling 2 amino 5 naphthol 7 sulfonic acid with 1-7 Cleve's acid is added and sufficient soda ash added to keep the coupling mixture alkaline throughout the coupling. The mixture is stirred until coupling is complete. The reaction mass is then made slightly acid to Congo and salted out with sodium chloride. The dye is filtered and the press cake dissolved in 6000 parts of water and treated with 220 parts of chromium chloride and 250 parts of sodium formate. The mixture is boiled for several hours and then the dye salted out with sodium chloride. The product is filtered and dried. It is a dark powder, soluble in water, and dyes animal fibers tones of dark blue.

The formula for the dye prior to metallization is as follows:

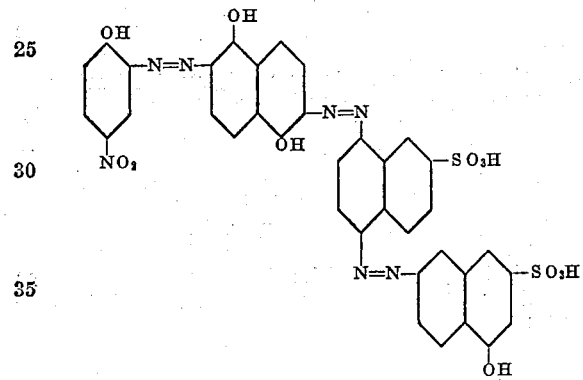

Example 4

Dissolve one molecular weight of the dye obtained by coupling 1-5 dihydroxy naphthalene on one side with diazo para cresol sulfonic acid and on the other with 1 dinaphthyl 5 hydroxy 6 azo naphthyl 8 hydroxy 3-6 disulfonic acid in 12–15 times its weight in water. Add two molecular equivalents of sodium acetate and one molecular equivalent of chromium chloride and one molecular equivalent of copper sulfate. Adjust the pH to 4 and boil for several hours testing samples to ascertain the degree to which metallization has occurred. Adjust if it is necessary with further quantities of sodium acetate, chromium chloride and copper sulfate until metallization is complete. Salt out the metallized dye with sodium chloride and dry the press cake at about 70° C. The product is a dark powder, soluble in water and producing blue tones of black.

The formula for the dye prior to metallization is as follows:

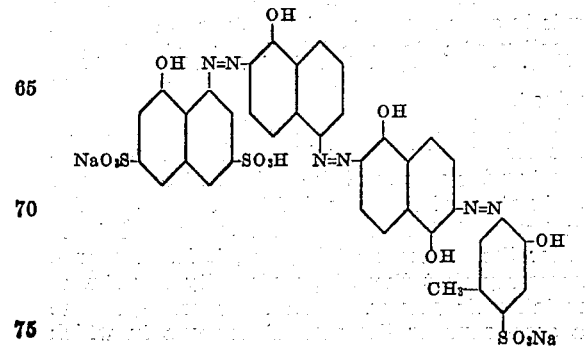

Example 5

Dissolve in water one molecular equivalent of the dye obtained by coupling to one mole of resorcinol first one mole of amino azo benzene para sulfonic acid and then one mole of picramic acid.

One molecular equivalent of the above azo dye is dissolved in 4000 parts of water. This is made slightly acid to Congo red and then 300 parts of 20% sodium acetate added. This solution is heated to 90° C. and a solution of basic chromium acetate made by dissolving 255 parts of basic chromium acetate in 1000 parts of water is added. It is then boiled for 3 to 4 hours and 10 parts of sodium chloride per 100 parts by volume is added, made slightly acid to Congo red and filtered. The dye when dry is a dark powder which dyes wool a yellowish brown tone.

The formula for the dye prior to metallization is as follows:

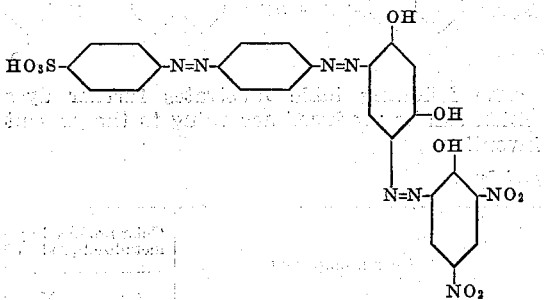

Example 6

154 parts of para nitro ortho amino phenol are dissolved in 200 parts of water and diazotized with the addition of 30 parts of 36% hydrochloric acid and 69 parts of sodium nitrite at 10° C. and cooled to 5–0° C.

160 parts of soda ash are added to the dye produced by coupling 277 parts of amino azo benzene para sulfonic acid to 194 parts of hexyl resorcinol. The nitro amino phenol diazo is added to this dye and coupling allowed to stir overnight. The dye is precipitated by addition of 15 parts of sodium chloride per 100 parts of volume and the dye is filtered.

One molecular equivalent of the above azo dye is dissolved in 4000 parts of water. This is made slightly acid to Congo red and then 300 parts of 20% sodium acetate added. This solution is heated to 90° C. and a solution of basic chromium acetate made by dissolving 255 parts of basic chromium acetate in 1000 parts of water is added. It is then boiled for 3 to 4 hours and 10 parts of sodium chloride per 100 parts by volume is added, made slightly acid to Congo red and filtered. The dye when dry is a brown powder which dyes wool yellowish brown.

The formula for the dye prior to metallization is as follows:

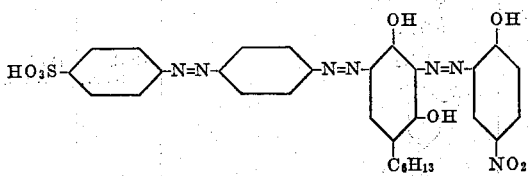

Example 7

The diazo equivalent to 27.7 parts real amino azo benzene para sulfonic acid, dissolved in 500 cc. of solution is coupled to 19.4 parts of hexyl resorcinol at 0° to 5° C. in the presence of 20% sodium acetate solution. 22.1 parts of sodium picramate are dissolved in 400 cc. of hot water and 30 parts of 36% hydrochloric acid are added and the slurry is cooled to 25° C. At 25–30° C. it is diazotized with 6.9 parts of sodium nitrite dissolved in water. After 45 minutes the diazotization is complete and the slurry is cooled to 5–0° C.

16 parts of soda ash are added to the dye and the diazo picramic acid added and the coupling allowed to stir over night. The next morning the pH is adjusted to 6. A very faint trace of red shows on methyl red yellow and it is negative to brilliant yellow paper. The dye produced is filtered without the addition of salt.

One molecular equivalent of the above azo dye is dissolved in 4000 parts of water. This is made slightly acid to Congo red and then 300 parts of 20% sodium acetate added. This solution is heated to 90° C. and a solution of basic chromium acetate made by dissolving 255 parts of basic chromium acetate in 1000 parts of water is added. It is then boiled for 3 to 4 hours and 10 parts of sodium chloride per 100 parts by volume is added, made slightly acid to Congo red and filtered. The dye when dry is a brown powder which dyes wool a reddish brown tone.

The formula for the dye prior to metallization is as follows:

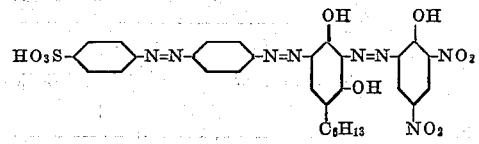

Example 8

22.1 parts of sodium picramate are dissolved in 400 parts of water and stirred to complete solution, then 12.6 parts of hydrochloric acid, 100% are added. The mixture is cooled to 30° C. and diazotized with the addition of 6.9 parts of sodium nitrite dissolved in water. 34.2 parts of chromotropic acid are dissolved in 400 parts of water with the addition of 9.4 parts of sodium bicarbonate. This solution is added to the picramic acid diazo and allowed to cool over night. The diazo from 27.7 parts of amino azo benzene is added to this monazo dye. 8 parts of magnesium oxide are added and the coupling is stirred for 4 or 5 hours. 600 parts of salt are added and hydrochloric acid is added until there is a faint but permanent test on Congo red paper. The dye is filtered after it has been stirred for several hours to complete precipitation.

One molecular equivalent of the above azo dye is dissolved in 4000 parts of water. This is made slightly acid to Congo red and then 300 parts of 20% sodium acetate added. This solution is heated to 90° C. and a solution of basic chromium acetate made by dissolving 255 parts of basic chromium acetate in 1000 parts of water is added. It is then boiled for 3 to 4 hours and 10 parts of sodium chloride per 100 parts by volume is added, made slightly acid to Congo red and filtered. The dye when dry is a dark blue powder which dyes wool a neutral gray.

The formula for the dye prior to metallization is as follows:

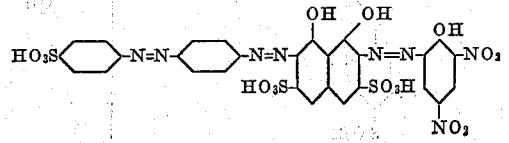

Example 9

Dissolve one molecular weight of the dye obtained by coupling 1-5 dihydroxy naphthalene with 2 diazo 1 naphthol 4 sulfonic acid on one side and with diazo phenyl azo nitro phenol azo urea J-acid on the other side in ten times its weight of water. Add two molecular equivalents of sodium acetate and two molecular equivalents of chromium chloride. Adjust the solution to a pH of 3-4 and boil for 4 hours. Salt out the dye with sodium chloride, filter, and dry at a temperature of between 60-70° C. It is a dark powder, soluble in water and dyes animal fibers dark tones of blue of excellent fastness.

The formula for the dye prior to metallization, is as follows:

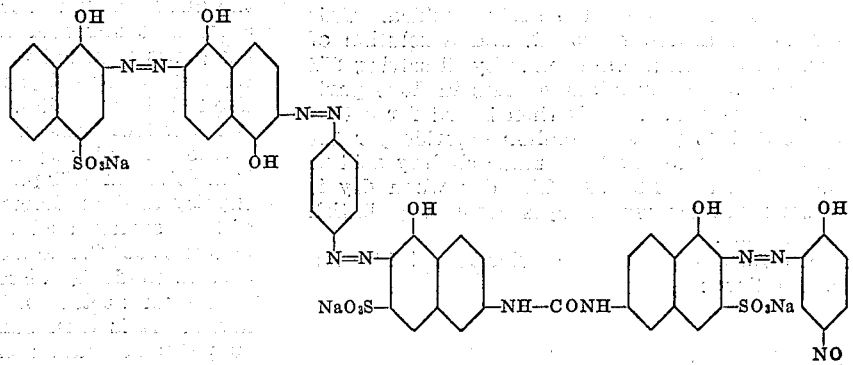

The following table illustrates further dyes which can be produced according to the present invention.

*Table of types of dyes*

| First component | Middle component | Second component | Color produced by metallized product ||
|---|---|---|---|---|
| | | | Cr | V |
| OH, NH₂, Cl (aminochlorophenol) | OH, OH (dihydroxybenzene) | NH₂-naphthyl-N=N-naphthyl(OH)(HO₃S)(SO₃H) | Black | Bluish black |
| OH, O₂N, NH₂, NO₂ (dinitroaminophenol) | OH, OH (dihydroxynaphthalene) | NH₂-naphthyl(SO₃H)-N=N-naphthyl(SO₃H) | do | Do |
| OH, O₂N, NH₂, NO₂ (dinitroaminophenol) | OH, OH (dihydroxybenzene) | NH₂-phenyl(OCH₃)-N=N-phenyl(SO₃H)(SO₃H) | Dark brown | Brown |
| NH₂-phenyl-N=N-C(HO-C)=C(CH₃)-N(N-phenyl-Cl,Cl,SO₃H) pyrazolone | OH, OH (dihydroxynaphthalene) | NH₂, HO, SO₃H aminohydroxybenzenesulfonic acid | Dark green | Dark green |

Table of types of dyes—Continued

| First component | Middle component | Second component | Color produced by metallized product | |
|---|---|---|---|---|
| | | | Cr | V |
| [structure] | [structure] | [structure] | Dark brown. | Brown. |
| [structure] | [structure] | [structure] | ...do.... | Olive brown. |
| [structure] | [structure] | [structure] | Black... | Bluish black. |
| [structure] | [structure] | [structure] | Bluish black. | Black. |
| [structure] | [structure] | [structure] | Reddish blue. | Bluish red. |
| [structure] | [structure] | [structure] | Blackish blue. | Blackish blue. |
| [structure] | [structure] | [structure] | Blue ... | Reddish blue. |
| [structure] | [structure] | [structure] | Dark brown. | Dark brown. |

Table of types of dyes—Continued

| First component | Middle component | Second component | Color produced by metallized product | |
|---|---|---|---|---|
| | | | Cr | V |
| (structure) | (structure) | (structure) | Blue green. | Blue green. |
| (structure) | (structure) | (structure) | Bluish black. | Bluish black. |
| (structure) | (structure) | (structure) | Brown. | Dark brown. |
| (structure) | (structure) | (structure) | Bluish black. | Dark blue. |
| (structure) | (structure) | (structure) | Black. | Black. |
| (structure) | (structure) | (structure) | Reddish blue. | Bluish red. |

Table of types of dyes—Continued

| First component | Middle component | Second component | Color produced by metallized product ||
|---|---|---|---|---|
| | | | Cr | V |
| 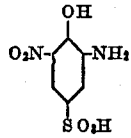 | 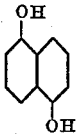 | 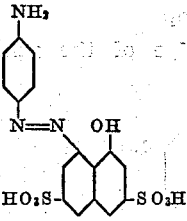 | Black | Black |
| 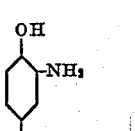 | 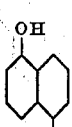 | 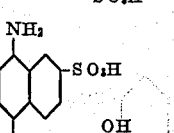 | Bluish red | Brown |
| 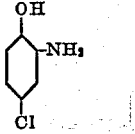 |  | 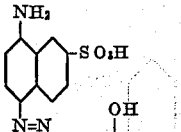 | Black | Black |

The unmetallized dye compounds described in the present application wherein the middle component is hexylresorcinol are new chemical compounds and are not claimed as a part of the present invention which is limited to the complex metallized compound produced by metallizing the dye with metals of the fifth and sixth groups of the periodic table of the elements.

What we claim is:

1. Metallized azo dyes having the following formula:

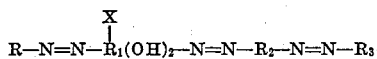

in which R, R1, R2 and R3 are aryl radicals, the hydroxyl groups on R1 are ortho to the azo groups and X represents a member of the group consisting of halogen, alkyl, alkoxy, nitro, carboxyl, sulfonic, hydroxyl and hydrogen, at least one of the radicals R and R2 has a metallizable group ortho to the azo group connecting the radical to R1 and at least one of the radicals R and R3 has a solubilizing group, and the dye being metallized with at least one of the metals included in the fifth and sixth groups of the periodic table of elements.

2. Metallized azo dyes, the azo dye component of which has the following formula:

R—N=N—R1(OH)2—N=N—R2—N=N—R3 in which R1 is a radical of the benzene series having the hydroxyl groups ortho to the azo groups and R, R2 and R3 are aryl radicals, at least one of the radicals R and R2 has a metal-lizable group ortho to the azo group connecting the radical with the resorcinol radical and at least one of the radicals R and R3 has a solubilizing group, and the dye being metallized with at least one of the metals included in the fifth and sixth groups of the periodic table of elements.

3. Metallized azo dyes, the azo dye component of which has the following formula:

R—N=N—R1(OH)2—N=N—R2—N=N—R3 in which the radicals R, R2 and R3 are aryl radicals, R1 is a radical of the naphthalene series having the hydroxyl groups ortho to the two azo groups, at least one of the radicals R and R2 having a metallizable group ortho to the azo group connecting the radical R1, and at least one of the radicals R and R3 containing a solubilizing group, and the dye being metallized with at least one of the metals included in the fifth and sixth groups of the periodic table of elements.

4. A metallized azo dye according to claim 1 in which both R and R2 contain metallizable groups ortho to the azo groups connecting these radicals with R1.

5. A metallized azo dye according to claim 1 in which R3 is an aryl-azo-aryl radical.

6. A metallized azo dye according to claim 1 in which R3 is an aryl radical free from azo groups except the one connecting to R2.

7. A metallized azo dye according to claim 2 in which R is phenol with the hydroxyl group ortho to the azo group and R2 is an azobenzene radical.

8. A metallized azo dye according to claim 2 in which R is:

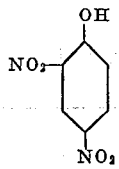

9. A metallized trisazo dye of the general formula:

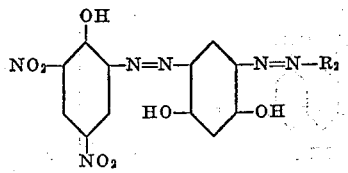

in which $R_2$ represents a radical of a 4'-sulfonic acid azobenzene, the dye being metallized with at least one metal included in the fifth and sixth groups of the periodic table of elements.

10. The complex chromium compound of the azo dye having the following formula:

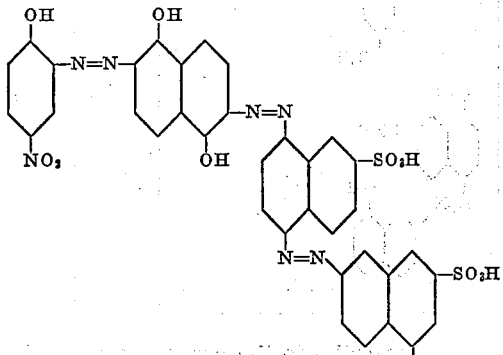

11. The complex chromium compound of the azo dye having the following formula:

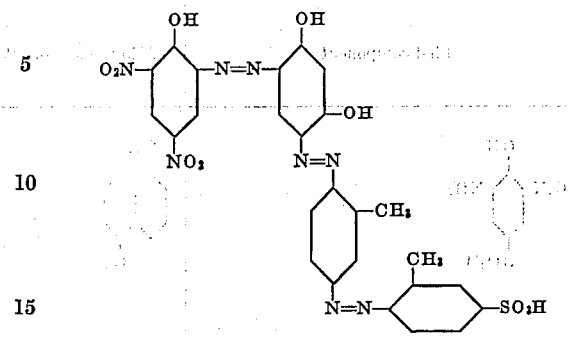

12. A metallized azo dye according to claim 1 in which both R and $R_2$ contain metallizable groups ortho to the azo groups connecting these radicals to $R_1$ and the dye metallized with a mixture of at least one of the metals included in the fifth and sixth groups of the periodic table of elements.

13. A complex chromium-copper compound of the azo dye having the following formula:

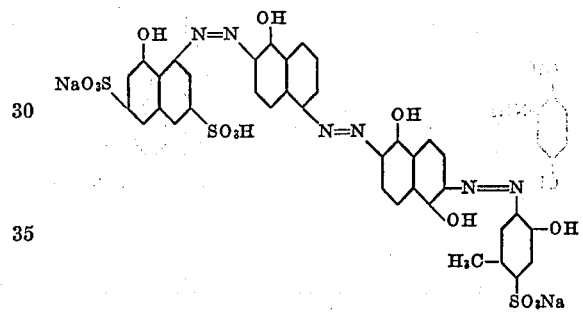

MOSES L. CROSSLEY.
LINCOLN M. SHAFER.